(12) United States Patent
Purpura et al.

(10) Patent No.: US 9,449,283 B1
(45) Date of Patent: Sep. 20, 2016

(54) SELECTING A TRAINING STRATEGY FOR TRAINING A MACHINE LEARNING MODEL

(71) Applicant: Context Relevant, Inc., Seattle, WA (US)

(72) Inventors: Stephen Purpura, Seattle, WA (US); James E. Walsh, Woodinville, WA (US); Dustin Lundring Rigg Hillard, Seattle, WA (US)

(73) Assignee: Context Relevant, Inc., Seattle, WA (US)

( * ) Notice: Subject to any disclaimer, the term of this patent is extended or adjusted under 35 U.S.C. 154(b) by 253 days.

(21) Appl. No.: 13/969,364

(22) Filed: Aug. 16, 2013

Related U.S. Application Data

(60) Provisional application No. 61/691,261, filed on Aug. 20, 2012.

(51) Int. Cl.
*G06F 15/18* (2006.01)
*G06N 99/00* (2010.01)
*G06N 7/00* (2006.01)
*G06K 9/62* (2006.01)
*G06N 5/02* (2006.01)

(52) U.S. Cl.
CPC .......... *G06N 99/005* (2013.01); *G06K 9/6256* (2013.01); *G06K 9/6269* (2013.01); *G06N 5/025* (2013.01); *G06N 7/005* (2013.01)

(58) Field of Classification Search
None
See application file for complete search history.

(56) References Cited

U.S. PATENT DOCUMENTS

| | | | | |
|---|---|---|---|---|
| 7,689,456 B2 * | 3/2010 | Schroeder | ............ | G06Q 10/04 705/7.31 |
| 7,788,195 B1 * | 8/2010 | Subramanian | ....... | G06N 99/005 706/20 |
| 7,933,762 B2 * | 4/2011 | Pinto | ..................... | G05B 17/02 703/22 |

OTHER PUBLICATIONS

A data driven ensemble classifier for credit scoring analysis Nan-Chen Hsieh a,*, Lun-Ping Hung b—2009 Elsevier Ltd. All rights reserved.*
A data driven ensemble classifier for credit scoring analysis—2010 Nan-Chen Hsieh a,*, Lun-Ping Hung.*
A data driven ensemble classifier for credit scoring analysis—2009 Patricia Brent, Nathan Green, Paul Breimyer, Ramya Krishnamurthy, Nagiza F. Samatova.*
Staelin, Carl. *Parameter Selection for Support Vector Machines.* Hewlett Packard Laboratories Israel. Technion City, Haifa, Israel. Published Nov. 10, 2003. 5 pages.

* cited by examiner

*Primary Examiner* — Kakali Chaki
*Assistant Examiner* — Ababacar Seck
(74) *Attorney, Agent, or Firm* — Fish & Richardson P.C.

(57) ABSTRACT

Methods, systems, and apparatus, including computer programs encoded on computer storage media, for training a machine learning model. One of the methods includes performing experiments to select a training strategy for use in training the model on a particular data set. The selected training strategy includes a binning strategy for binning the raw feature vectors before the raw feature vectors are provided to the predictive model.

30 Claims, 4 Drawing Sheets

SELECTING A TRAINING STRATEGY FOR TRAINING A MACHINE LEARNING MODEL

CROSS REFERENCE TO RELATED APPLICATIONS

This application is a non-provisional of and claims priority to U.S. Provisional Patent Application No. 61/691,261, filed on Aug. 20, 2012, the entire contents of which are hereby incorporated by reference.

BACKGROUND

This specification relates to training machine learning models.

Machine learning models receive input and generate an output based on the received input and on values of the parameters of the model. A machine learning model training system may train a machine learning model to determine values of the model parameters by finding a minimum or a maximum of a cost function of parameters of the model.

SUMMARY

This specification relates to training machine learning models.

Particular embodiments of the subject matter described in this specification can be implemented so as to realize one or more of the following advantages. The time required to train a predictive model on a large dataset, whether streaming or static, can be greatly reduced. The amount of data necessary to be transmitted, e.g., over a network, to the computer or computers of a server to train the predictive model on the large dataset can be greatly decreased. Input data that would otherwise cause instability in a model training process can be modified to improve stability of the process. The quality of the output of the trained predictive model can be improved. The amount of time required to re-train a previously trained predictive model, e.g., when a change in the input data has caused the model to perform unsatisfactorily, can be greatly reduced.

A predictive model trained as described in this specification may be used to predict a number of different types of outputs, depending on what the input features and vectors represent.

For example, the predictive model could be used to generate financial product trade price or direction predictions, i.e., predicting the next trade price of particular financial product, or whether the next trade of a particular product likely to be at a higher price, or at a lower price, than the most recent trade.

As another example, the predictive model could be used to generate fraud or anomaly predictions for credit card transactions, or for debit card transactions, i.e., predicting the likelihood that a particular transaction is fraudulent or otherwise anomalous.

As another example, the predictive model could be used to generate fraud or anomaly predictions for claims data for any type of financial claims processing, i.e., predicting the likelihood that a particular insurance claim, or health care claim, or employee expense claim, is fraudulent or otherwise anomalous and worthy of further inspection.

As another example, the predictive model could be used to generate expected values for financial transaction data for any type of purchase decision making, i.e., predicting what the expected value would be for a health care claim for a particular procedure in a certain city, or the expected price of airfare between two cities on a particular date, or the expected price of a hotel room in a particular city on a particular date. These expected values could then further be used in fraud or anomaly detection or prediction, i.e., if a financial transaction or claim was for an amount sufficient different than the predicted value, it may potentially be considered fraudulent or anomalous.

As another example, the predictive model could be used to generate likelihoods of user activities in an interactive computer based system. For example, predicting the likelihood that a user would click on a particular button on a web page, or purchase a particular product, or click on a particular advertisement or advertising link.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
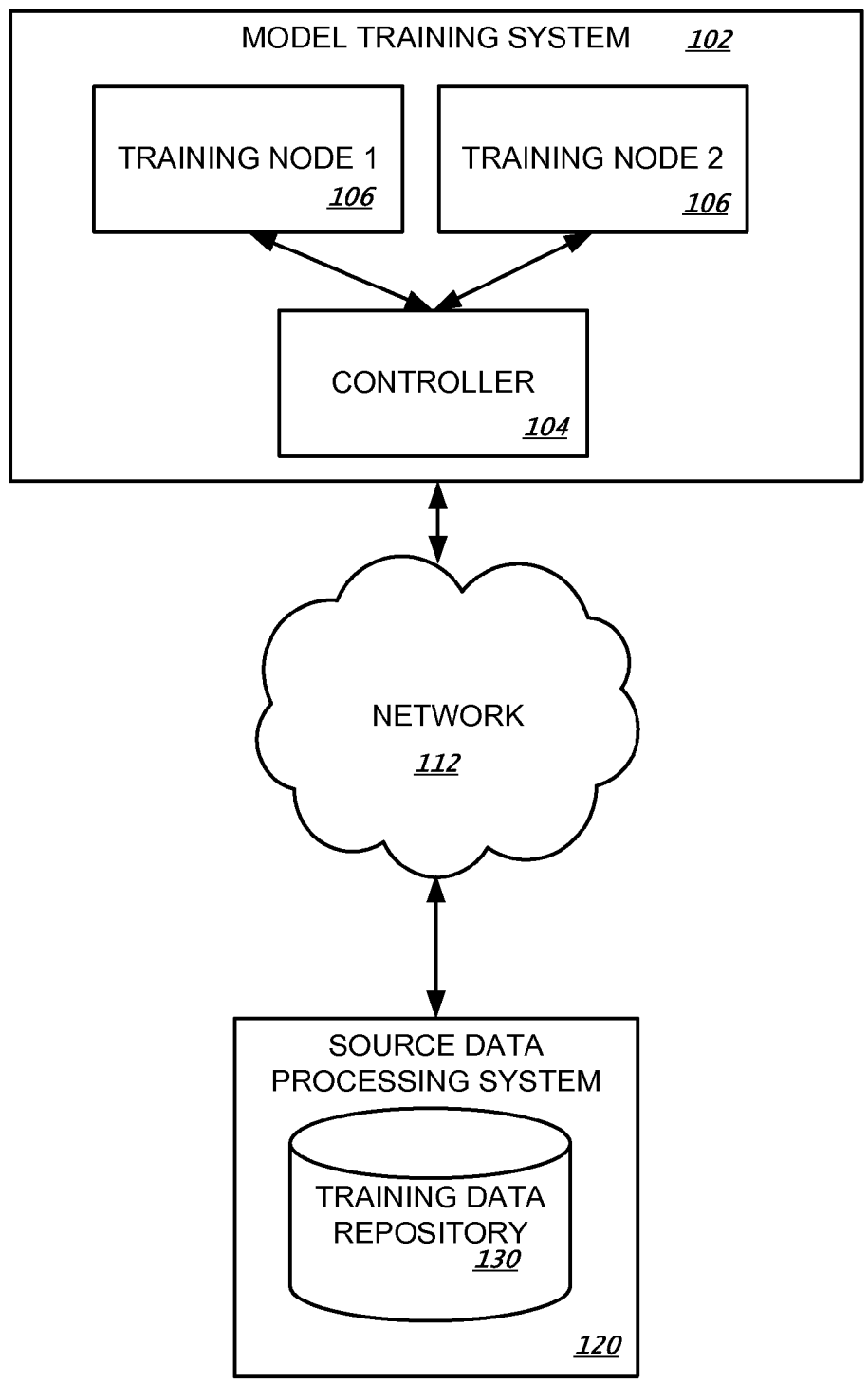
FIG. 1 shows an example model training system.

FIG. 1 shows an example model training system 102. The model training system 102 is an example of a system implemented as one or more computer programs on one or more computers in one or more locations, in which the systems, components, and techniques described below can be implemented.

The model training system 102 is coupled to a source data processing system 120 through a data communication network 112, e.g., local area network (LAN) or wide area network (WAN), e.g., the Internet, or a combination of networks, any of which may include wireless links. The model training system 102 receives data from the source data processing system 120 over the network 112 and uses the data to train a machine learning model. In some implementations, the model training system 102 and the source data processing system 120 are implemented on one or more common computers.

The machine learning model is a predictive model that receives an input, i.e., a feature vector, and predicts an outcome based on the received input and on values of the parameters of the model. The machine learning model is trained using training data from a training data repository 130. The training data in the training data repository 130 are training examples for which the desired outcome, i.e., the outcome that should be predicted by the model, is known or is estimated. Each example provided to a model—whether for training or, later, for evaluation—will be referred to as a "feature vector," in accordance with convention, although the data can actually be arranged, transmitted, and used in any convenient form. Similarly, each data item in a feature vector will be referred to as a "feature," which has a value. By training a model, the model training system 102 generates values of the model parameters by minimizing or maximizing a cost function that is a measure of the performance of the model on the training data as a function of the model parameters. The trained parameter values may for convenience be referred to as "optimal" values, with the understanding that this usage does not imply that the values are optimal in any absolute sense.

The model training system 102 includes a controller 104 and multiple training nodes 106. The controller 104, which may be implemented on one or more computers in one or more locations, receives training data from the source data processing system 120 and partitions the training data among the training nodes 106 for use in training the predictive model. Each of the training nodes 106 runs an instance of the predictive model and trains the instance of the model in response to instructions received from the controller 104. Each training node is a computing unit that may include one or more processors, co-processors, graphics processing units (GPUs), or cores and that operates on a complete set of training data to generate, i.a., a set of model parameters as a result of training.

Generally, each feature vector provided for the model is generated by modifying a raw data instance, e.g., a data record, of the raw training data stored in the training data repository 130. That is, features in a given feature vector are generated by modifying the data in one or more fields of a corresponding raw data instance. For example, in accordance with conventional practice, the fields in the raw data instance will be transformed, e.g., the feature values may be standardized or normalized. As another example, the data in fields of the feature vector that do not contain numerical values may be hashed.

Further, each numerical value in the raw data instance is binned according to a binning strategy in order to generate features that are included in the feature vector. An example feature vector generated by binning numerical values in an original raw data instance is described below with reference to FIG. 2. Determining a binning strategy to be used for training the predictive model is described below with reference to FIGS. 3 and 4.

In addition to features generated by binning an original data value, the features in the feature vectors provided to the model can optionally include values derived from two or more data values, e.g., values that are polynomials of normalized feature values or binned feature values up to a small degree, e.g., one or two, and values that are a product of two or more normalized or binned feature values.

The processing of the data to modify the raw data instances to generate the final form of the feature vectors that are provided to the model can be performed on the source data processing system 120 in order to reduce the amount of data transmitted to the model training system 102.

Figure 2:
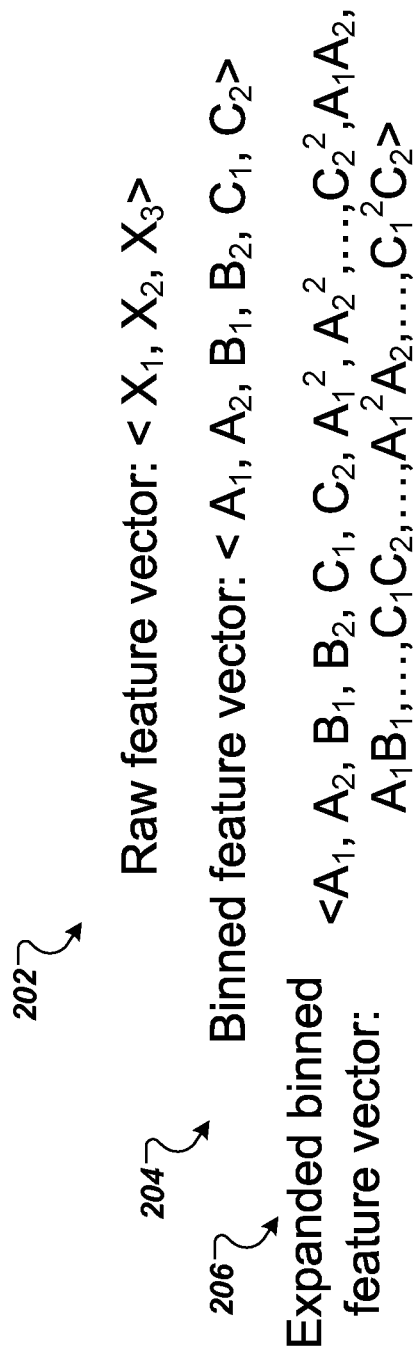
FIG. 2 shows example feature vectors.

FIG. 2 shows example feature vectors 202, 204, and 206. Raw feature vector 202 can be, e.g., a raw data instance from a training data repository that has been standardized and normalized. Raw feature vector 202 includes three fields, each with a respective numerical value, i.e., $X_i$, $X_2$, and $X_3$.

Binned feature vector 204 is a feature vector that has been generated from the raw feature vector 202 by binning each of the values $X_1$, $X_2$, and $X_3$, e.g., according to a binning strategy that has been selected by a model training system. The binning strategy includes, for each feature in the raw feature vector 202 that has a numerical value or a value of a type that can be categorized, a rule for determining the number of bins that the value may potentially be binned into and a rule for determining which values are placed into each bin, i.e., a rule for determining bin membership.

The rule for determining bin membership can be selected from a set of possible rules. The set of possible rules can include, for example, a rule that selects the bins so that the range of values included in each bin is equal, i.e., so that each bin has an equal size. As another example, the set of possible rules can include a rule that selects the endpoints of the bins based on the distribution of the values of that feature in the data set, i.e., so that approximately the same number of data items that are included in the data set are placed into each bin. As another example, the set of possible rules can include a rule that clusters values of the feature in the data set into the bins using conventional clustering techniques, e.g., k-means clustering. As another example, the set of possible rules can include one or more rules that determine bin membership based on a separate machine learning model that estimates the membership of each value of the feature into one of the bins.

In the illustrated example, each of the values has been binned into two bins. For example, the field in the raw feature vector 202 that contains the value $X_1$ has been divided into two fields in the binned feature vector 204, and those fields contain the values $A_1$ and $A_2$, respectively. However, because each field that contains a numerical value or a value of a type that can be categorized is binned according to a respective rule, the fields may be divided into a different number of bins and the rule that determines how the membership of each bin is selected may not be the same for each field. Generally, depending on which of the bins the value $X_1$ is placed into, one of the values out of $A_1$ and $A_2$ will be zero and the other value will be non-zero. However, in some cases, a given value may not be able to be placed into one of the bins with a high enough degree of certainty and more than one of the bins that the given value could be placed into may be assigned a non-zero value. Additionally, in some cases, a given value may not be placed into any of the bins, e.g., because the system has learned that the value is anomalous and should be ignored during training. In these cases, the value in each bin may be zero.

The expanded binned feature vector 206 is generated from the binned feature vector 204 by concatenating fields to the end of the binned feature vector 204 that contain values that are generated from two or more of the values in the binned feature vector 204, e.g., are products of two or more of the values from the binned feature vector 204. The expanded feature vector 206 may be an example of a feature vector that is provided to a predictive model, i.e., so that the predictive model can predict an outcome based on the expanded binned feature vector 206.

While the example feature vectors 202, 204 and 206 contain only numerical values, fields that contain non-numerical values, e.g., a string of characters, may also be included in the feature vectors 202, 204, and 206. In some implementations, these non-numerical values are hashed before being provided to the predictive model. Alternatively, one or more of the non-numerical values may be converted to numerical values, e.g., by converting a string of characters into its term frequency-inverse document frequency (T-IDF) weight. The numerical value may then optionally be binned. Further, in some implementations, while the model is being trained on the data set by the model training system, one or more values that have a corresponding parameter value whose absolute value is below a threshold value may be removed from each expanded feature vector before the vector is provided to the model for evaluation.

The processing necessary to generate the expanded binned feature vector 206 from the raw feature vector 202 can be done on a source data processing system, e.g., in response to instructions received from the model training system that specify the binning strategy to be used in binning raw feature vectors.

Figure 3:
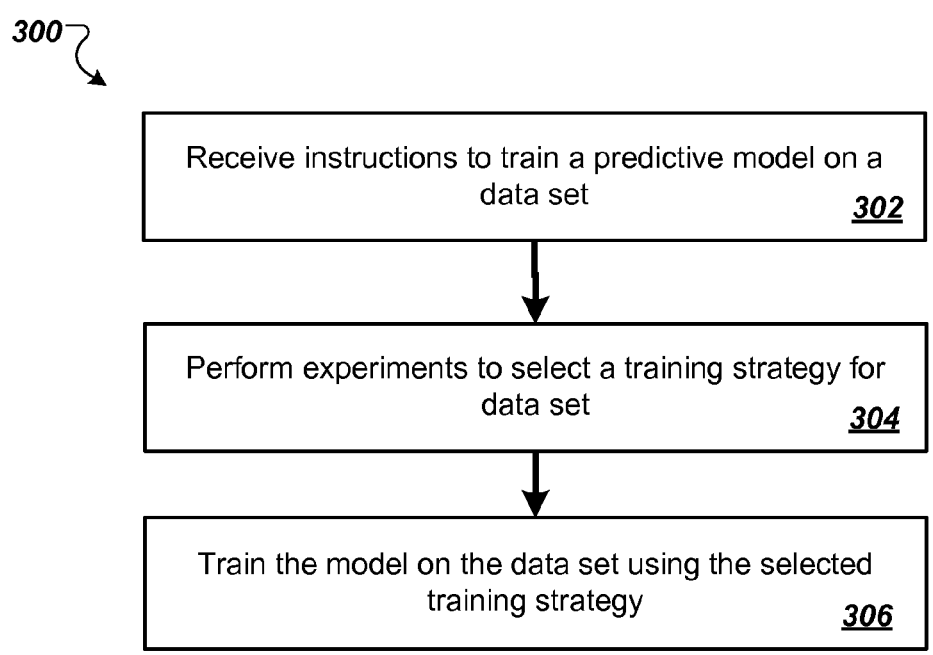
FIG. 3 is a flow diagram of an example process for training a predictive model on a data set.

FIG. 3 is a flow diagram of an example process 300 for training a model. For convenience, the process 300 will be described as being performed by a system of one or more computers located in one or more locations. For example, a model training system, e.g., the model training system 102 of FIG. 1, appropriately programmed in accordance with this specification, can perform the process 300.

The system receives instructions to train a predictive model on a data set (step 302). The data set is a set of raw training data, e.g., raw training data in the training data repository 130 of FIG. 1.

The system performs experiments to select a training strategy for the data set (step 304). A training strategy includes a binning strategy and may optionally include a strategy for determining the makeup of the set of training data processed during each iteration of the model training process. A binning strategy specifies, for each of one or more fields in the raw data vectors, a rule for the number of bins the values in the field are divided into and a rule for selecting the membership of each of those bins. The strategy for determining the makeup of the set of training data includes a rule specifying a number of feature vectors to be included in the set of training data, a rule specifying a proportion of new feature vectors to old feature vectors in the in the set of training data, or both. A new feature vector is a feature vector that has not yet been used to train the predictive model, and an old feature vector is a feature vector that has already been used to train the predictive model. An example method for performing experiments to select a training strategy is described below with reference to FIG. 4.

The system trains the model on the data set using the selected training strategy (step 306). That is, the system performs multiple iterations of a model training process in order to determine optimal values of the model parameters. Before training the model on a given feature vector, the system can transmit instructions to a source data processing system, e.g., the source data processing system 120 of FIG. 1, that cause the source data processing system to bin raw feature vectors in the set of raw training data according to the binning strategy included in the selected training strategy before they are provided to the system. Alternatively, the system may bin the raw feature vectors according to the binning strategy after they are received from the source data processing system.

If the selected training strategy includes a strategy for determining the makeup of the set of training data, the system trains the model using sets of training data that conform to the strategy for determining the makeup. For example, during training, a controller, e.g., controller 104 of FIG. 1, can instruct training nodes, e.g., training nodes 106 of FIG. 1, to, for each iteration of the model training process performed by the nodes, operate on a respective set of training data that has the number of feature vectors specified by the strategy, the proportion of new to old feature vectors specified by the strategy, or both. In some implementations, the proportion and the number of feature vectors may be adjusted during training of the model, e.g., if tests performed during training indicate that the strategy is not effective.

Figure 4:
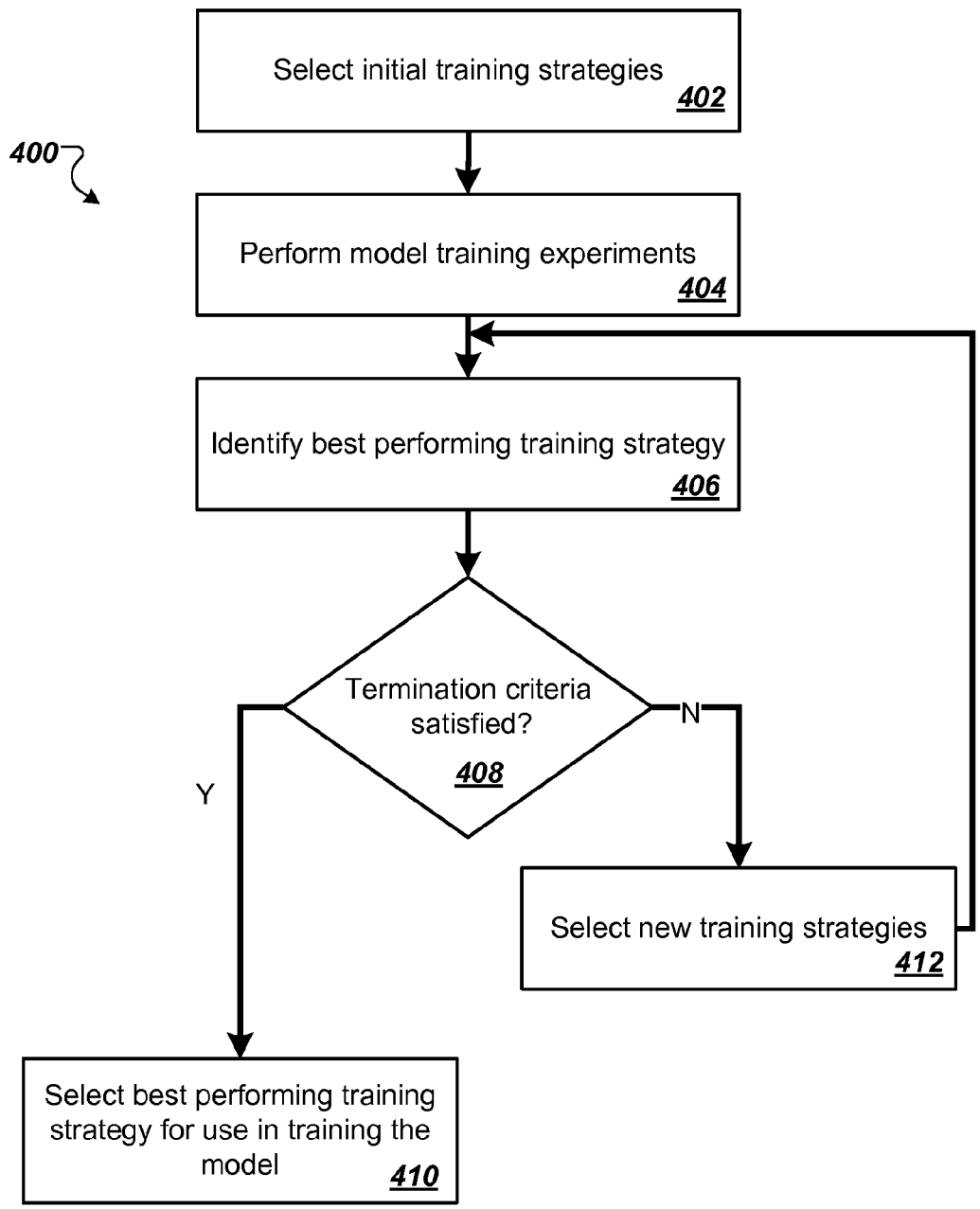
FIG. 4 is a flow diagram of an example process for performing experiments to select a training strategy.

FIG. 4 is a flow diagram of an example process 400 for performing experiments to select a training strategy for training a predictive model. For convenience, the process 400 will be described as being performed by a system of one or more computers located in one or more locations. For example, a model training system, e.g., the model training system 102 of FIG. 1, appropriately programmed in accordance with this specification, can perform the process 400.

The system selects initial training strategies (step 402). Each initial training strategy is different from each other initial training strategy and specifies a binning strategy and a training set makeup strategy. The initial strategies that are chosen may be determined empirically, e.g., based on which initial strategies have historically performed well in quickly determining training strategies for training the model. In some circumstances, one or more rules may be kept constant among each of the training strategies. That is, each initial training strategy may specify the same rule for one or more of selecting the number of bins, selecting the membership of each of the bins, number of feature vectors in each training data set, and so on. In some cases, one or more of the initial training strategies may specify that one or more numerical features not be binned.

The system performs model training experiments (step 404). For each model training experiment, the system trains the predictive model using a different training strategy, e.g., the system can perform a different model training experiment using each of the initial training strategies. In some implementations, for each experiment, the system sends instructions to a source data processing system that cause the source data processing system to bin raw features vectors according to the initial training strategy and provide the binned feature vectors to the system. Alternatively, the system may bin the feature vectors after they are received from the source data processing system.

To train the predictive model during an experiment, the system performs iterations of a model training process until convergence criteria are satisfied. For example, the convergence criteria may include a specified level of performance, e.g., a specified measure of quality of the output of the model, a specified number of iterations, or a specified length of time. Generally, the convergence criteria are "loose" criteria. That is, the criteria are substantially relaxed from the criteria used to determine convergence during actual training of the model.

The system can perform some or all of the model training experiments in parallel. That is, the system can perform multiple experiments simultaneously by assigning different training nodes to train the model using different training strategies. In some implementations, each training node stores the training data the training node uses to train the model during the experiments for use in any additional experiments that may be required.

The system identifies a best performing training strategy based on the results of the experiments (step 406). For example, the system can identify as the best performing strategy the training strategy used by the experiment that reached the specified level of performance in the shortest amount of time or the training strategy used by the experiment that had the best level of performance when the experiment was terminated. As another example, the system may identify the best performing strategy by testing the models trained using each of the training strategies on small portions of new live data, as in A/B testing.

The system determines whether specified termination criteria are satisfied (step 408).

For example, the system may determine whether the performance of the model is likely to improve if one or more of: the binning strategy is adjusted, additional training data is used, or new features are introduced. If the test indicates that the performance of the model is not likely to improve, the system can determine that the termination criteria are satisfied. In order to test whether performance is likely to improve, the system can, for example, determine whether the times required for experiments using the best performing training strategies from each of a specified number of most recent iterations of the process 400 are within a window of pre-determined size. As another example, the system can determine whether measures of the quality of the model at the termination of the experiments using the best performing training strategies from each of a specified number of most recent iterations of the process 400 are within a window of pre-determined size. The measure of quality of the model can be one of, e.g., an accuracy measure, a precision measure, a recall measure, a Receiver Operating Characteristic (ROC) analysis, an area under the curve analysis, a gain analysis, a cumulative gain analysis, and so on. As another example, the system may determine that the termination criteria are satisfied if a time allotted for performing the training experiments has expired or if computer resources allocated to the training experiments have been exhausted.

If the termination criteria are satisfied, the system selects the best performing strategy for use in training the model (step 410).

If the termination criteria are not satisfied, the system selects new training strategies (step 412). The system selects the new training strategies by adjusting the best performing training strategy. That is, the system may generate a new training strategy from the best performing strategy by modifying any of: rules that determine the number of bins one or more of the features are divided into, rules that determine how the membership of bins for one or more of the features are selected, a rule that determines the number of feature vectors in each set of training data, or a rule that determines the ratio of new to old feature vectors in each set of training data.

The system can use any of a variety of techniques in determining how to generate a new training strategy by adjusting the best performing training strategy.

In one example technique for generating the new strategies, the system can select new strategies from the set of possible training strategies until each potential new strategy has been used in a training experiment or until the termination criteria have been satisfied.

As another example, the system may select the new training strategies from the best performing training strategy by keeping certain ones of the rules specified by the best performing training strategy constant among each new training strategy and varying other rules among the new training strategies. For example, the system may incrementally adjust one of the rules while keeping other rules constant. The system may continue adjusting the rule until adjusting the rule does not result in an improvement in the performance of the model. The system may then hold that rule constant and attempt to adjust other rules.

As another example, the system can determine how to adjust rules for selecting the number of bins or rules for determining membership of each of the bins based in part on historical data that identifies binning strategies that have been successful for training a model on similar data sets. In determining whether or not two data sets are similar, the system can consider one or more of whether the two data sets contain data collected by the same entity, whether the two data sets contain data generated by the same data source or using the same measurement instrument, whether the features in the two data sets have similar characteristics, e.g., features that are similarly sparse or dense, whether the two data sets have similar feature vector metadata, e.g., log data generated by a variety of web servers, or whether the two data sets measure similar human actions, e.g., clicks on a link included in a web page or an online advertisement, or whether the data sets contain similar numbers of raw feature vectors As another example, the system can determine how to adjust rules for selecting the number of bins or rules for determining the membership of the bins for a given feature based in part on a measure of the entropy of the feature during the training of the model that uses the best performing strategy. If the absolute value of the measure of the entropy of the feature is greater than a threshold value, it may be an indication that the rule for how the membership of the bins is selected should be adjusted for the new training strategies. If the measure is less than or equal to the threshold value and is positive, it may be an indication that the number of bins for the feature should be increased. If the measure is greater than or equal to the threshold value and negative, it may be an indication that the number of bins for the feature should be decreased.

As another example, when selecting the new strategies, the system may adjust a best performing strategy from a previous iteration of the method 400 based on rules specified in the best performing strategy from the current iteration. That is, even if, during an earlier iteration, the best performing training strategy included a rule that specified that each set of training data should have a particular number of feature vectors and the system held the particular number constant for each new training strategy in the subsequent iteration, the system may adjust the particular number in subsequent iterations.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:

receiving instructions to train a predictive model on a particular data set, wherein the particular data set includes a plurality of raw feature vectors;

performing experiments to select a training strategy for use in training the predictive model on the particular data set, wherein the selected training strategy includes a binning strategy for binning the raw feature vectors before the raw feature vectors are provided to the predictive model, and wherein performing experiments comprises:

selecting a plurality of training strategies, wherein each of the plurality of training strategies includes a respective binning strategy;

performing a respective training experiment for each of the plurality of training strategies by training the model using the training strategy;

identifying a best performing training strategy from the plurality of training strategies based on results of the respective training experiments for each of the plurality of training strategies; and generating a first new training strategy from the best performing training strategy by adjusting the binning strategy included in the best performing training strategy based on a measure of entropy of one or more features during the training of the model using the best performing training strategy, comprising, for a particular feature in the raw feature vectors, determining whether to decrease a number of bins for the particular feature based on an absolute value of a measure of entropy of the particular feature during the training of the model using the best performing training strategy; and training the predictive model on the particular data set using the selected training strategy.

2. The method of claim 1, wherein performing experiments further comprises:

determining that termination criteria are not satisfied after performing the respective training experiment for each of the plurality of training strategies;

in response to determining that the termination criteria are not satisfied, generating one or more new training strategies including the first new training strategy based on the best performing training strategy; and performing a respective training experiment for each of the new training strategies by training the model using the new training strategy.

3. The method of claim 2, wherein performing experiments further comprises:

identifying a best performing new training strategy;

determining that the termination criteria are satisfied; and selecting the best performing new training strategy as the training strategy for use in training the predictive model on the particular data set.

4. The method of claim 2, wherein generating new training strategies based on the best performing training strategy comprises adjusting the best performing training strategy based on historical data that identifies binning strategies that have previously been successful for training predictive models on data sets similar to the particular data set.

5. The method of claim 2, wherein generating new training strategies based on the best performing training strategy comprises keeping one or more rules specified by the best performing training strategy constant among each new training strategy and varying other rules among the new training strategies.

6. The method of claim 1, wherein the selected training strategy includes a strategy for determining a makeup of sets of training data to be used to train the predictive model.

7. The method of claim 6, wherein the strategy for determining the makeup includes a rule for determining a number of feature vectors to be included in each set and a rule for determining a ratio of new feature vectors to old feature vectors to be included in each set.

8. The method of claim 1, wherein:

the plurality of raw feature vectors comprises vectors representing completed financial product transactions including transaction prices; and the predictive model is a model predicting a next transaction price or a next transaction price direction for one or more financial products.

9. The method of claim 1, wherein:

the plurality of raw feature vectors comprises vectors representing completed credit card transactions or debit card transactions or both; and the predictive model is a model classifying particular transactions as likely being anomalous or not.

10. The method of claim 1, wherein:

the plurality of raw feature vectors comprises vectors representing financial claims processing transactions; and the predictive model is a model classifying particular transactions as likely being anomalous or not.

11. The method of claim 1, wherein:

the plurality of raw feature vectors comprises vectors representing prices for products or services or both at particular times or places or both; and the predictive model is a model predicting prices for products or services or both in particular places or on particular dates or both.

12. The method of claim 1, wherein:

the plurality of raw feature vectors comprises vectors representing purchase transactions representing purchases of products or services or both and including respective prices paid for the products or services or both; and the predictive model is a model predicting prices for products or services in particular places or on particular dates or both.

13. The method of claim 12, wherein:

the predictive model is further a model classifying particular prices for particular products or services as likely being anomalous or not.

14. The method of claim 13, wherein:

the predictive model is further a model classifying particular prices for particular products or services as likely being fraudulent or not.

15. The method of claim 1, wherein:

the plurality of raw feature vectors comprises vectors representing user actions on an interactive computer-based system; and the predictive model is a model predicting user actions on the interactive computer-based system.

16. The method of claim 1, wherein adjusting the binning strategy included in the best performing training strategy based on a measure of entropy of one or more features during the training of the model using the new training strategy comprises, for the particular feature:

when the absolute value of the measure of entropy of the particular feature during the training of the model using the new training strategy is greater than a threshold value, adjusting a rule for how a membership of the bins for the particular feature is determined;

when the absolute value of the measure of entropy of the particular feature is less than or equal to the threshold value and the measure of entropy of the particular feature is positive, increasing the number of bins for the particular feature; and when the absolute value of the measure of entropy of the particular feature is less than or equal to the threshold value and the measure of entropy of the particular feature is negative, decreasing the number of bins for the particular feature.

17. The method of claim 1,
wherein performing a respective training experiment for each of the plurality of training strategies by training the model using the training strategy comprises training the model using the training strategy until experiment convergence criteria are satisfied,
wherein training the model on the particular data set using the selected training strategy comprises training the model on the particular data set using the selected training strategy until actual training convergence criteria are satisfied, and
wherein the experiment convergence criteria are relaxed from the actual training convergence criteria.

18. A system comprising one or more computers and one or more storage devices storing instructions that are operable, when executed by the one or more computers, to cause the one or more computers to perform operations comprising:
receiving instructions to train a predictive model on a particular data set, wherein the particular data set includes a plurality of raw feature vectors;
performing experiments to select a training strategy for use in training the predictive model on the particular data set, wherein the selected training strategy includes a binning strategy for binning the raw feature vectors before the raw feature vectors are provided to the predictive model, and wherein performing experiments comprises:
selecting a plurality of training strategies, wherein each of the plurality of training strategies includes a respective binning strategy;
performing a respective training experiment for each of the plurality of training strategies by training the model using the training strategy;
identifying a best performing training strategy from the plurality of training strategies based on results of the respective training experiments for each of the plurality of training strategies; and
generating a first new training strategy from the best performing training strategy by adjusting the binning strategy included in the best performing training strategy based on a measure of entropy of one or more features during the training of the model using the best performing training strategy, comprising, for a particular feature in the raw feature vectors, determining whether to decrease a number of bins for the particular feature based on an absolute value of the measure of entropy of the particular feature during the training of the model using the best performing training strategy; and
training the predictive model on the particular data set using the selected training strategy.

19. The system of claim 18, wherein performing experiments further comprises:
determining that termination criteria are not satisfied after performing the respective training experiment for each of the plurality of training strategies;
in response to determining that the termination criteria are not satisfied, generating one or more new training strategies including the first new training strategy based on the best performing training strategy; and
performing a respective training experiment for each of the new training strategies by training the model using the new training strategy.

20. The system of claim 19, wherein performing experiments further comprises:
identifying a best performing new training strategy;
determining that the termination criteria are satisfied; and
selecting the best performing new training strategy as the training strategy for use in training the predictive model on the particular data set.

21. The system of claim 19, wherein generating new training strategies based on the best performing training strategy comprises adjusting the best performing training strategy based on historical data that identifies binning strategies that have previously been successful for training predictive models on data sets similar to the particular data set.

22. The system of claim 19, wherein generating new training strategies based on the best performing training strategy comprises keeping one or more rules specified by the best performing training strategy constant among each new training strategy and varying other rules among the new training strategies.

23. The system of claim 19, wherein determining that termination criteria are not satisfied comprises determining that a performance of the model is likely to improve if one or more of: the binning strategy from the best performing training strategy is adjusted, additional training data is used, or new features are introduced.

24. A non-transitory computer storage medium encoded with instructions that, when executed by one or more computers, cause the one or more computers to perform operations comprising:
receiving instructions to train a predictive model on a particular data set, wherein the particular data set includes a plurality of raw feature vectors;
performing experiments to select a training strategy for use in training the predictive model on the particular data set, wherein the selected training strategy includes a binning strategy for binning the raw feature vectors before the raw feature vectors are provided to the predictive model, and wherein performing experiments comprises:
selecting a plurality of training strategies, wherein each of the plurality of training strategies includes a respective binning strategy;
performing a respective training experiment for each of the plurality of training strategies by training the model using the training strategy;
identifying a best performing training strategy from the plurality of training strategies based on results of the respective training experiments for each of the plurality of training strategies; and
generating a first new training strategy from the best performing training strategy by adjusting the binning strategy included in the best performing training strategy based on a measure of entropy of one or more features during the training of the model using the best performing training strategy, comprising, for a particular feature in the raw feature vectors, determining whether to decrease a number of bins for the particular feature based on an absolute value of the measure of entropy of the particular feature during the training of the model using the best performing training strategy; and training the predictive model on the particular data set using the selected training strategy.

25. The non-transitory computer storage medium of claim 24,
wherein performing experiments further comprises:
determining that termination criteria are not satisfied after performing the respective training experiment for each of the plurality of training strategies;
in response to determining that the termination criteria are not satisfied, generating one or more new training strategies including the first new training strategy based on the best performing training strategy; and
performing a respective training experiment for each of the new training strategies by training the model using the new training strategy.

26. The non-transitory computer storage medium of claim 25, wherein performing experiments further comprises:
identifying a best performing new training strategy;
determining that the termination criteria are satisfied; and
selecting the best performing new training strategy as the training strategy for use in training the predictive model on the particular data set.

27. The non-transitory computer storage medium of claim 25, wherein generating new training strategies based on the best performing training strategy comprises adjusting the best performing training strategy based on historical data that identifies binning strategies that have previously been successful for training predictive models on data sets similar to the particular data set.

28. The non-transitory computer storage medium of claim 25, wherein generating new training strategies based on the best performing training strategy comprises keeping one or more rules specified by the best performing training strategy constant among each new training strategy and varying other rules among the new training strategies.

29. A system comprising one or more computers and one or more storage devices storing instructions that are operable, when executed by the one or more computers, to cause the one or more computers to perform operations comprising:
receiving instructions to train a predictive model on a particular data set, wherein the particular data set includes a plurality of raw feature vectors;
performing experiments to select a training strategy for use in training the predictive model on the particular data set, wherein the selected training strategy includes a binning strategy for binning the raw feature vectors before the raw feature vectors are provided to the predictive model, and wherein performing experiments comprises:
selecting a plurality of training strategies, wherein each selected training strategy includes a respective binning strategy;
performing a respective training experiment for each of the plurality of training strategies by training the predictive model using the training strategy until experiment convergence criteria are satisfied;
identifying a best performing training strategy from the plurality of training strategies based on results of the respective training experiments for each of the plurality of training strategies;
determining that termination criteria for performing experiments are not satisfied after performing the respective training experiment for each of the plurality of training strategies;
in response to determining that the termination criteria are not satisfied:
generating one or more new training strategies based on the best performing training strategy, comprising generating a first new training strategy by adjusting a binning strategy from the best performing training strategy based on a measure of entropy of one or more features during the training of the model using the best performing training strategy, comprising, for a particular feature in the raw feature vectors, determining whether to decrease a number of bins for the particular feature based on an absolute value of the measure of entropy of the particular feature during the training of the model using the best performing training strategy; and
performing a respective training experiment for each of the new strategies by training the model using the new training strategy until the experiment convergence criteria are satisfied; and
training the predictive model on the particular data set using the selected training strategy until actual training convergence criteria are satisfied, wherein the experiment convergence criteria are relaxed from the actual training convergence criteria.

30. A method performed by one or more computers, the method comprising:
receiving instructions to train a predictive model on a particular data set, wherein the particular data set includes a plurality of raw feature vectors;
performing experiments on a plurality of training strategies and based on the experiments selecting a training strategy for use in training the predictive model on the particular data set,
wherein each training strategy of the plurality of training strategies includes a respective binning strategy for binning the raw feature vectors before the raw feature vectors are provided to the predictive model,
wherein each binning strategy includes, for each of a plurality of features of the raw feature vectors, a first rule for determining a number of bins for the feature and a second rule for determining membership of each of the bins for the feature,
wherein the respective binning strategy of each of the plurality of training strategies has a different first rule, a different second rule, or both from the respective binning strategy of each other training strategy of the plurality of training strategies, and
wherein performing the experiments comprises:
selecting a plurality of training strategies, wherein each of the plurality of training strategies includes a respective binning strategy;
performing a respective training experiment for each of the plurality of training strategies by training the model using the training strategy;
identifying a best performing training strategy from the plurality of training strategies based on results of the respective training experiments for each of the plurality of training strategies; and
generating a first new training strategy from the best performing training strategy by adjusting the binning strategy included in the best performing training strategy based on a measure of entropy of one or more features during the training of the model using the best performing training strategy, comprising, for a particular feature in the raw feature vectors, determining whether to decrease a number of bins for the particular feature based on an absolute value of a measure of entropy of the particular feature during the training of the model using the best performing training strategy; and
training the predictive model on the particular data set using the selected training strategy.

* * * * *

UNITED STATES PATENT AND TRADEMARK OFFICE
CERTIFICATE OF CORRECTION

| | | |
|---|---|---|
| PATENT NO. | : 9,449,283 B1 | Page 1 of 1 |
| APPLICATION NO. | : 13/969364 | |
| DATED | : September 20, 2016 | |
| INVENTOR(S) | : Stephen Purpura, James E. Walsh and Dustin Lundring Rigg Hillard | |

It is certified that error appears in the above-identified patent and that said Letters Patent is hereby corrected as shown below:

Claims

In Claim 18, column 13, line 57, delete "value of the" and insert -- value of a --.

In Claim 24, column 14, line 67, delete "value of the" and insert -- value of a --.

In Claim 29, column 16, line 15, delete "value of the" and insert -- value of a --.

Signed and Sealed this
Fifteenth Day of November, 2016

Michelle K. Lee
*Director of the United States Patent and Trademark Office*